Oct. 30, 1956 J. N. CRANWILL 2,768,740

REEL ENGAGEABLE DEVICE FOR RETAINING A METALLIC TAPE IN TIGHTLY WOUND POSITION THEREIN AND FOR COVERING THE OTHERWISE EXPOSED SURFACE THEREOF

Filed April 13, 1955

JAMES N. CRANWILL

INVENTOR.

BY G. Lorenz Miller

ATTORNEY

United States Patent Office 2,768,740

Patented Oct. 30, 1956

2,768,740

REEL ENGAGEABLE DEVICE FOR RETAINING A METALLIC TAPE IN TIGHTLY WOUND POSITION THEREIN AND FOR COVERING THE OTHERWISE EXPOSED SURFACE THEREOF

James N. Cranwill, Springfield, Ill.

Application April 13, 1955, Serial No. 501,016

1 Claim. (Cl. 206—53)

This invention relates to a reel engageable device for retaining a metallic tape in tightly wound position therein and for covering the otherwise exposed surface thereof.

The invention is more particularly concerned with a device for use with a reel having a substantial length of magnetic tape wound therein.

Experience from the use of such particular form of tape has shown that same must be handled with extreme care in order that it will function correctly. In fact the magnetic tape is very sensitive to scratches, distortions, or dirt so far as its proper functioning is concerned.

Reels having magnetic tapes wound therein have heretofore been stored in reference boxes to keep the wound tapes secure from dust deposits, and such tapes which are several hundred feet in length have been retained in wound positions in the reels by more or less makeshift means, such as strings, rubber bands, and rubber plugs inserted between the walls of the reels to bear against the exposed faces of the wound tapes.

This resulted in the tapes not being held in firm packed condition inasmuch as the tapes often became loosened in the reels, even when in storage. Furthermore, the tapes were occasionally damaged in the placing of such strings, rubber bands and other fastening means, as well as in the removing of same from the reels when the tapes were to be used.

Furthermore, the above referred to makeshift means failed to provide adequate dust excluding means.

It is accordingly a primary object of this invention to provide a device which is removably engageable with a reel having a length of magnetic tape wound therein and which device provides for retaining the tape in tightly wound position and for excluding the admission of dust thereto.

A further and more specific object of the invention is to provide a device for use with a reel having a length of magnetic tape wound therein and which includes a non-abrasive member for tightly engaging the free end of the wound tape and a dust excluding strap for extending around the outer circumferential face of the wound tape.

Other objects and advantages of the invention will become apparent in the course of the following detailed description, taken in connection with the accompanying drawing, wherein—

Fig. 7 is an end elevational view of the structure shown in Fig. 6 with the label omitted.

Figure 2:
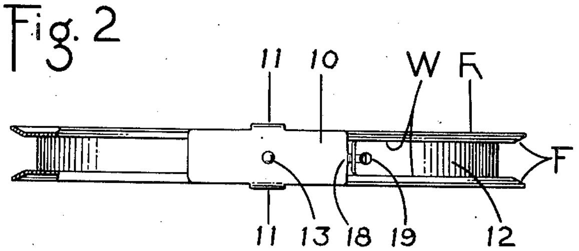
Fig. 2 is a top plan view of the reel and the device associated therewith with the label omitted.

Referring now in detail to the drawing, R designates a reel of standard form and which includes axially spaced side walls W and a central winding core (not shown). The side walls W are provided with outwardly diverging marginal flanges F.

Figure 3:
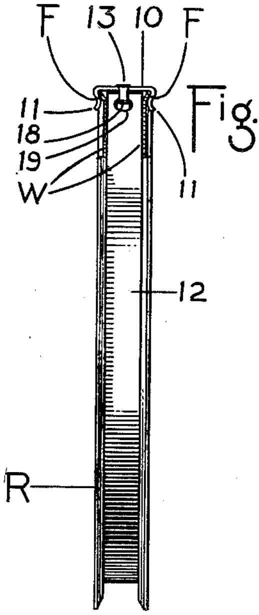
Fig. 3 is an elevational view as observed from the right of Fig. 1 and wherein the label is omitted and the upper portions of the reel side walls broken away and in section.
Figure 4:
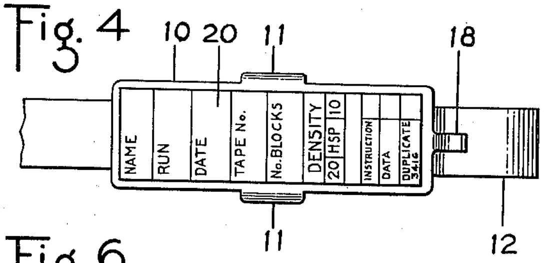
Fig. 4 is an enlarged fragmental detail plan view of the invention, showing the locking hook empty and the label being shown with its printed indicia as an example of a conventional type of label adapted for use with the invention.
Figure 5:
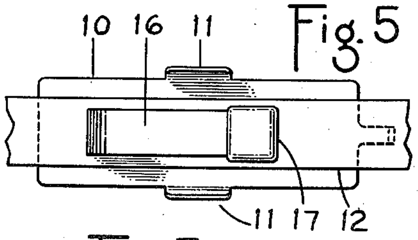
Fig. 5 is a broken plan view as observed from the bottom of Fig. 4.

The device according to the instant invention comprises a generally rectangular and flat lock plate 10 which is provided on its opposite side edges and intermediate its opposite ends with laterally opposed spring tongues 11 which in combination with the plate provide a spring clip which is frictionally and releasably engageable with the reel flanges F as is most clearly indicated in Fig. 3.

The device further comprises an elongated strap 12 which, as is clearly indicated in Figs. 2 and 3, is of a width substantially equal to the distance between the inner faces of the reel side walls W.

Figure 6:
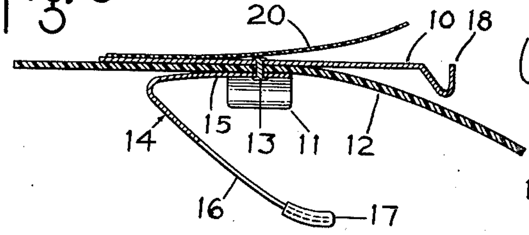
Fig. 6 is an enlarged fragmental detail sectional view as observed in a longitudinal central vertical plane of Fig. 4 with the lower end of the tape engaging spring being shown in elevation.
Figure 6:
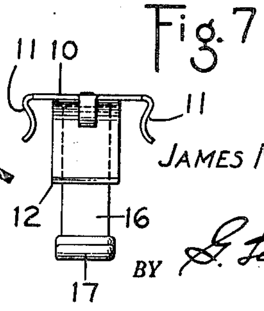

One end of the strap 12 extends along the inner face of the plate 10 and is secured thereto by a rivet 13 and which rivet also extends through one end of a leaf spring 14 which includes a strap engaging portion 15 through which the rivet extends and an inwardly directed somewhat curved portion 16 disposed at an acute angle to the portion 15 as is clearly shown in Fig. 6.

The free end of the spring 14 is disposed substantially inwardly of the secured portion 15 and is rubber coated as indicated at 17 for a purpose later set forth.

Figure 1:
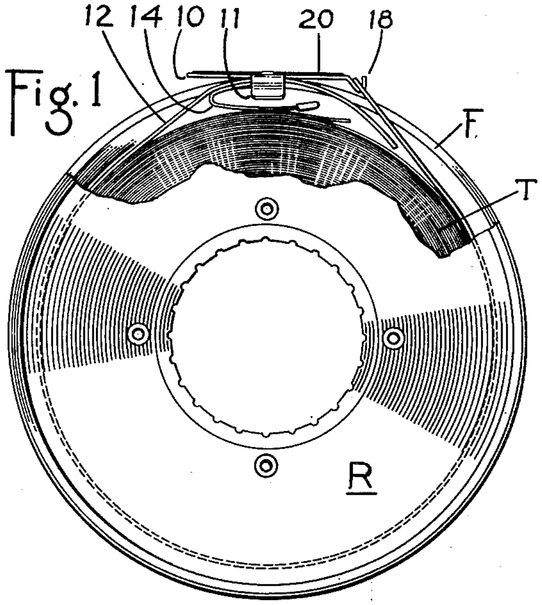
Fig. 1 is a side elevational view of a typical form of reel, an upper portion of one reel wall being broken away for disclosing the invention in operative association with the reel.

The lock plate 10 is provided on one end thereof with a hook 18 and the free end of the strap 12 is provided with an aperture 19 for receiving the hook 18 when the strap has been extended about the circumferential surface of the wound tape T, as is clearly indicated in Fig. 1.

The strap 12 is preferably of plastic material and is of a length to firmly grip the wound tape.

It will be noted that a substantial length of the strap extends beyond the securing rivet 13 whereby material is available for securing the strap to the plate 10 such that the strap firmly engages the wound tape when the hook 18 is engaged within the aperture 19.

A plastic label 20 is applied to the outer face of the lock plate 10 and the same is preferably coated with adhesive suitable to enable the label to be repeatedly applied and removed as may be required in making changes in the spaces provided for writing in the indicia on the label.

When the clip including the opposed spring tongues 11 is being sprung over the reel flanges F in the initial assembly of the device, the rubber coated end 17 of the spring portion 16 will initially engage the free end of the wound tape T and due to the smooth soft characteristic of the rubber, the tape will not be marred by the otherwise sharp end of the spring. When the clip with the lock plate is fully applied, as in Fig. 1, the rubber coated end 17 of the spring portion 16 will be free of the tape and same will be engaged by the smooth under surface of the spring portion 16 which will be under sufficient tension to hold the free end of the wound tape T in position.

When the locking plate has thus been applied to the reel R, the strap 12 will be brought around the tape and the hook 18 engaged within the aperture 19 whereupon the strap will not only function to retain the plate 10 and spring 14 in position but will fully seal the reel against collection of dust as well as guard same against impact by any means.

While I have disclosed my invention in accordance with a single specific structural embodiment thereof, such is to be considered as illustrative only, and not restrictive, the scope of the invention being defined in the sub-joined claim.

What I claim and desire to secure by U. S. Letters Patent is:

A device for retaining a magnetic tape in tightly wound position within a reel including opposite side walls having laterally diverging peripheral flanges; comprising a plate, means on said plate for releasably connecting same to said flanges with the plate resting on the flanges in tangential relation thereto, means connected to said plate comprising a strap of a width substantially equal to the distance between the inner faces of said side walls of the reel for firm engagement with the outer face of the winding on the reel, said plate being provided with a hook on one end thereof, one end of said strap being secured to said plate and the free end of said strap being provided with an aperture for receiving said hook, and means supported by said plate for pressure engagement with the free end of the tape.

References Cited in the file of this patent

UNITED STATES PATENTS

| | | |
|---|---|---|
| 211,604 | Tarbutt | Jan. 21, 1879 |
| 331,616 | Coburn et al. | Dec. 1, 1885 |
| 564,070 | Hartmann | July 14, 1896 |
| 901,069 | Chelson et al. | Oct. 13, 1908 |
| 1,297,606 | Stultz | Mar. 18, 1919 |
| 1,497,236 | Happe | June 10, 1924 |
| 2,038,910 | Stich | Apr. 28, 1936 |
| 2,128,710 | MacDonald | Aug. 30, 1938 |
| 2,246,984 | Palmer | June 24, 1941 |